No. 836,018. PATENTED NOV. 13, 1906.
J. M. DRAKE.
POTATO PLOW.
APPLICATION FILED JUNE 27, 1906.
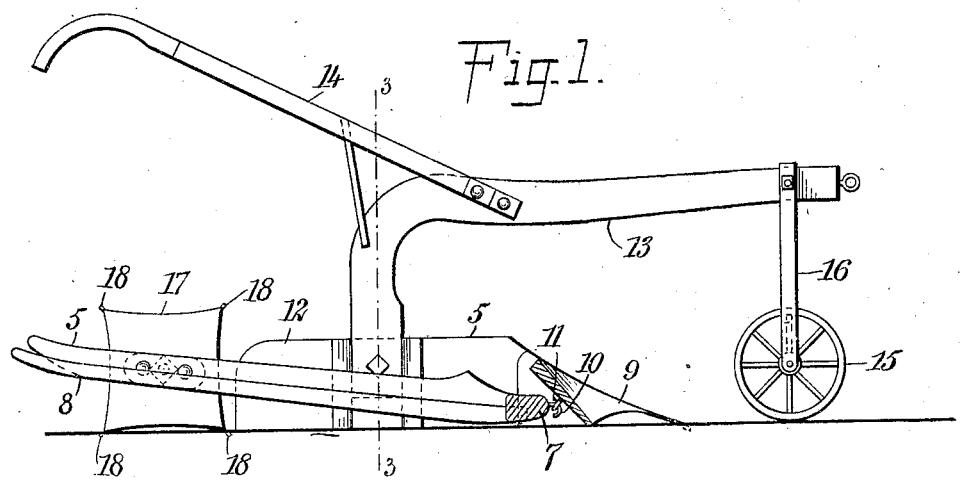
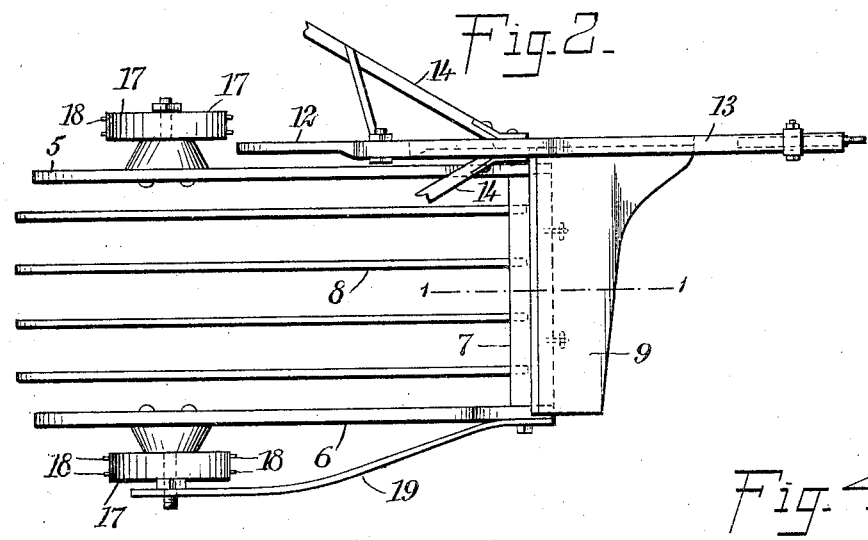
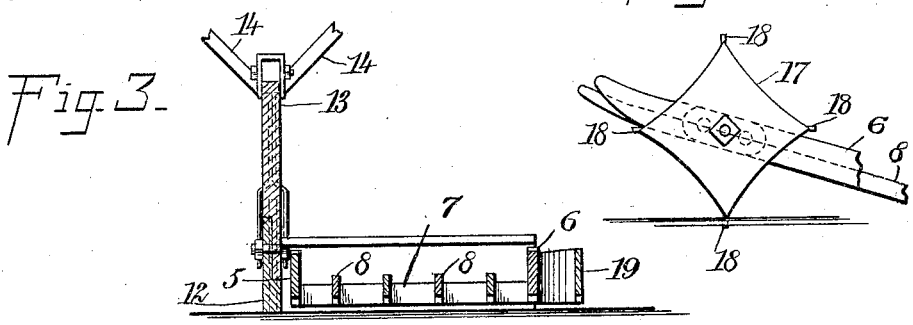
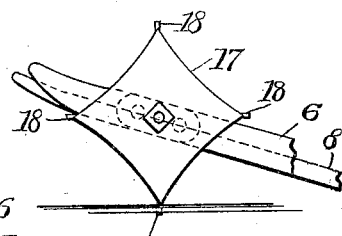
WITNESSES
INVENTOR
James M. Drake
BY Munn & Co
ATTORNEYS

UNITED STATES PATENT OFFICE.

JAMES M. DRAKE, OF SHAWANO, WISCONSIN.

POTATO-PLOW.

No. 836,018.　　　Specification of Letters Patent.　　　Patented Nov. 13, 1906.

Application filed June 27, 1906. Serial No. 323,717.

*To all whom it may concern:*

Be it known that I, JAMES M. DRAKE, a citizen of the United States, and a resident of Shawano, in the county of Shawano and State of Wisconsin, have invented a new and Improved Potato-Plow, of which the following is a full, clear, and exact description.

This invention relates to improvements in potato-plows, the object being to provide a device of this character that will be simple in construction, inexpensive, and having a novel means for shaking the dirt from the potatoes.

I will describe a potato-plow embodying my invention and then point out the novel features in the appended claims.

Reference is to be had to the accompanying drawings, forming a part of this specification, in which similar characters of reference indicate corresponding parts in all the figures.

Figure 1 is a side elevation, partly in section, on the line 1 1 of Fig. 2, of a potato-plow embodying my invention. Fig. 2 is a plan thereof. Fig. 3 is a transverse section on the line 3 3 of Fig. 1, and Fig. 4 is a fragmentary side view showing one of the agitating devices.

The frame of the plow comprises side members 5 6, connected at the forward end to a cross-bar 7, and also connected to the cross-bar 7 are rearwardly-extended shaker-bars 8, which are spaced apart to permit the dirt passing through, while the potatoes pass over said bars and discharge at the rear end. The frame has swinging connection with the shovel or plow 9. As here shown, the connections consist of hooks 10 on the cross-bar, which engage in eyes 11 on the shovel.

Extended rearward from the shovel 9 at one side of the plow-frame is a plate 12, to which is attached the plow-beam 13, provided with handles 14 and having at its front end a supporting-wheel 15, which, as here shown, has its journaled bearings in hangers 16, attached to the beam.

Mounted on the side members of the frame rearward of the plow are the agitating devices, consisting of wheels 17, which are rectangular, or practically so, in contour, and on the corners of the wheels are teeth 18.

At the side of the frame opposite the beam is a shoe 19, which is curved and connected at its forward end with the frame and engaging at its rear end with the axle of the wheel 17. This shoe is designed to slide upon the ground when the plow is turned edgewise or in turning corners.

By arranging the standard of the beam at one side of the plow instead of at the center, as in the usual construction, the entangling of roots and vines with the standard is avoided.

In the operation as the plow moves forward the potatoes plowed from the hills will pass over and upon the bars 8, and the agitating-wheels 17, owing to their shape, will cause vertical and lateral jolting of the frame and the bars 8.

Having thus described my invention, I claim as new and desire to secure by Letters Patent—

1. A potato-digger comprising a vertically-swinging frame, bars carried by the frame, a shovel at the forward end of the frame, a beam arranged at one side of the frame, and substantially rectangular wheels arranged at the rear portion of the frame.

2. A potato-plow comprising a frame, shaker-bars extended lengthwise of the frame, a shovel with which the frame has swinging connection, a beam arranged at one side of the frame, agitating-wheels mounted on the side members of the frame, the said wheels being substantially rectangular in contour, and a curved plate secured on the frame at the opposite side to that of the beam.

3. A potato-plow comprising a frame, a shovel with which said frame has swinging connection, and rectangular agitating-wheels mounted on the frame.

In testimony whereof I have signed my name to this specification in the presence of two subscribing witnesses.

JAMES M. DRAKE.

Witnesses:
　　HARRY C. HANSEN,
　　LEON P. REYNOLDS.